(12) United States Patent
Wheater

(10) Patent No.: US 7,290,139 B2
(45) Date of Patent: Oct. 30, 2007

(54) SYSTEM FOR UPDATING AN INFORMATION STATE RECEIVED FROM ANOTHER COMPUTER BASED UPON VALIDATION RULES THAT APPLY TO THE INFORMATION STATE

(75) Inventor: Stuart Mark Wheater, Newcastle upon Tyne (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 10/452,802

(22) Filed: May 30, 2003

(65) Prior Publication Data

US 2004/0054795 A1 Mar. 18, 2004

(30) Foreign Application Priority Data

Jun. 1, 2002 (GB) ................................. 0212843.7

(51) Int. Cl.
*H04L 9/00* (2006.01)
(52) U.S. Cl. ......................................... 713/167; 705/26
(58) Field of Classification Search ................ 709/229; 713/167, 176, 187; 380/277; 705/37, 26
See application file for complete search history.

(56) References Cited

U.S. PATENT DOCUMENTS

| | | | |
|---|---|---|---|
| 5,917,912 A * | 6/1999 | Ginter et al. ................ | 713/187 |
| 6,298,445 B1 | 10/2001 | Shostack et al. ............ | 713/201 |
| 2001/0002485 A1* | 5/2001 | Bisbee et al. ................ | 713/167 |
| 2002/0029337 A1* | 3/2002 | Sudia et al. ................ | 713/176 |
| 2002/0048369 A1* | 4/2002 | Ginter et al. ................ | 380/277 |
| 2002/0169706 A1* | 11/2002 | Chandra et al. ............... | 705/37 |
| 2004/0054795 A1* | 3/2004 | Wheater ...................... | 709/229 |

FOREIGN PATENT DOCUMENTS

| | | | |
|---|---|---|---|
| EP | 0 709 760 A2 | 5/1996 |
| EP | 0 717 353 A2 | 6/1996 |
| EP | 1 168 165 A2 | 1/2002 |

* cited by examiner

*Primary Examiner*—Le Hien Luu
(74) *Attorney, Agent, or Firm*—Ladas & Parry LLP

(57) ABSTRACT

A computer system comprising a first and second computer entity having program-accessible information; wherein the second computer entity is arranged to modify the second computer entity's program-accessible information in accordance with a received change to the first computer entity's program-accessible information if the second computer entity determines that the received change to the first computer entities program-accessible information complies with a first predetermined criteria and irrefutably establishes that the received change is associated with the first computer entity.

25 Claims, 5 Drawing Sheets

SYSTEM FOR UPDATING AN INFORMATION STATE RECEIVED FROM ANOTHER COMPUTER BASED UPON VALIDATION RULES THAT APPLY TO THE INFORMATION STATE

BACKGROUND OF THE INVENTION

The present invention relates to a method and system for updating an information state.

Organisations are increasingly using the Internet to offer their services and to utilise the services of others.

However, even though the Internet provides tremendous potential for allowing parties to interact it can prove difficult, when using the Internet, to provide assurances that parties to an agreement are acting in a trusted manner.

In particular, the provision of services require that all associated parties mutually agree certain conditions, where a party needs confidence that once a condition has been agreed another party can not repudiate what has already been agreed.

One solution to this problem has been the use of trusted third parties, where each party to an agreement interacts with a trusted third party, thereby allowing the trusted third party to maintain a master copy of an information state that defines the terms agreed between the parties and, as such, prevent the repudiation by any party of any of the agreed terms.

However, due to the nature of the relationship with a trusted third party such relationships can take a long time to establish.

It is desirable to improve this situation.

SUMMARY OF THE INVENTION

In accordance with a first aspect of the present invention there is provided a computer system comprising a first and second computer entity having program-accessible information; wherein the second computer entity is arranged to modify the second computer entity's program-accessible information in accordance with a received change to the first computer entity's program-accessible information if the second computer entity determines that the received change to the first computer entity's program-accessible information complies with a first predetermined criterion and irrefutably establishes that the received change is associated with the first computer entity.

This provides the advantage of allowing a party to modify an electronic agreement within specified rules and to allow parties to the electronic agreement to maintain irrefutable evidence of any changes initiated by other parties to the agreement.

Suitably irrefutability is determined based upon a second predetermined criterion.

Preferably the second predetermined criteria is the electronic signing of the received change or representation of the change with a private key of the first computer entity.

Preferably the second computer entity further comprises a memory for storing a copy of a certificate associated with the first computer entity to allow the second computer entity to authenticate the first computer entity's electronic signature.

Preferably the first computer entity is arranged to provide to the second computer entity the change to the first computer entities program-accessible information.

Preferably first predetermined criteria determine the rules for allowing the first computer entity to implement a change to the first computer entities program-accessible information.

Suitably the second computer entity is arranged to provide a confirmation of acceptance of change to the second computer entities program-accessible information to the first computer entities.

Preferably the program-accessible information is an object state.

In accordance with a second aspect of the present invention there is provided a computer system comprising a first and second computer entity having program-accessible information; wherein the second computer entity is arranged to modify the second computer entities program-accessible information in accordance with a received change to the first computer entities program-accessible information if the second computer entity determines that the received change to the first computer entities program-accessible information complies with a first predetermined criteria and establishes that the received change is associated with the first computer entity based upon trusted third party data associated with the first computer entity.

Preferably the received change or representation of the change is signed with the trusted third party data.

Preferably the second computer entity further comprises a memory for storing a copy of a certificate associated with the trusted third party to allow the second computer entity to authenticate the signed change or representation of the change signed with the trusted third party data.

In accordance with a third aspect of the present invention there is provided a method comprising receiving by a second computer entity a change to program-accessible information of a first computer entity and modifying program-accessible information of the second computer entity in accordance with the received change to program-accessible information of the first computer entity if the second computer entity determines that the received change to the first computer entities program-accessible complies with a first predetermined criteria and irrefutably establishes that the received change is associated with the first computer entity.

Suitably irrefutability is determined based upon second predetermined criteria.

In accordance with a fourth aspect of the present invention there is provided a computer apparatus comprising a processor arranged to modify program-accessible information in accordance with a received change to program-accessible information of another computer apparatus if the processor determines that the received change to the program-accessible information of the another computer apparatus complies with predetermined criteria and irrefutably establishes that the received change is associated with the another computer apparatus.

Suitably irrefutability is determined based upon a second predetermined criteria.

Preferably the second predetermined criteria is the electronic signing of the received change or representation of the change with a private key of the another computer apparatus.

Preferably the computer apparatus further comprises a memory for storing a copy of a certificate associated with the another computer apparatus to allow the processor to authenticate the another computer apparatus electronic signature.

In accordance with a fifth aspect of the present invention there is provided a computer apparatus comprising a processor arranged to modify program-accessible information in accordance with a received change to program-accessible information of another computer apparatus if the processor determines that the received change to the program-accessible of the another computer apparatus complies with a first predetermined criteria and establishes that the received change is associated with the another computer apparatus based upon trusted third party data associated with the another computer apparatus.

In accordance with a sixth aspect of the present invention there is provided a computer system comprising a plurality of computer entities, wherein each computer entity includes program-accessible information; and wherein a computer entity is arranged to modify their respective program-accessible information in accordance with a received change to another computer entities program-accessible information if the computer entity determines that the change to the another computer entities program-accessible information complies with first predetermined criteria of the respective computer entity and irrefutably establishes that the received change is associated with the another computer entity.

BRIEF DESCRIPTION OF THE DRAWINGS

For a better understanding of the present invention and to understand how the same may be brought into effect reference will now be made, by way of example only, to the accompanying drawings, in which.

DESCRIPTION OF THE PREFERRED EMBODIMENTS

The present embodiment describes a computer system that represents a number of interacting organisations, through respective computer entities, in which application programs of the organisations use distributed program-accessible information (e.g. distributed object states) to allow all relevant organisations (i.e. all organisations involved in a given transaction) to validate any changes to an object state, thereby preventing any one organisation determining the status of an object state.

The use of distributed object states allows a relevant object state, which corresponds to the state of a transaction, to be replicated within each organisation involved in the transaction. This allows all proposed changes to the object state to be evaluated locally by the respective computer entity based upon predetermined rules, where an attempt to implement a change contrary to the specified rules will result in the rejection of the change by the other organisations involved in the transaction.

Additionally, proposed changes to an object state are electronically signed by the proposing organisation and are, therefore, attributable to that organisation, therefore ensuring that the proposing organisation can not refute the change at a later period.

Further, organisations sharing the same object state can show their acceptance of proposed changes by counter-signing the proposal and returning this to the proposing organisation.

A non-repudiation log can be used by each organisation to record the evidence associated with any of the object state changes.

Additionally, it is preferable that any change to an object state is only held valid if all organisations that share the object state have validated the proposed change to the object state.

Figure 1:
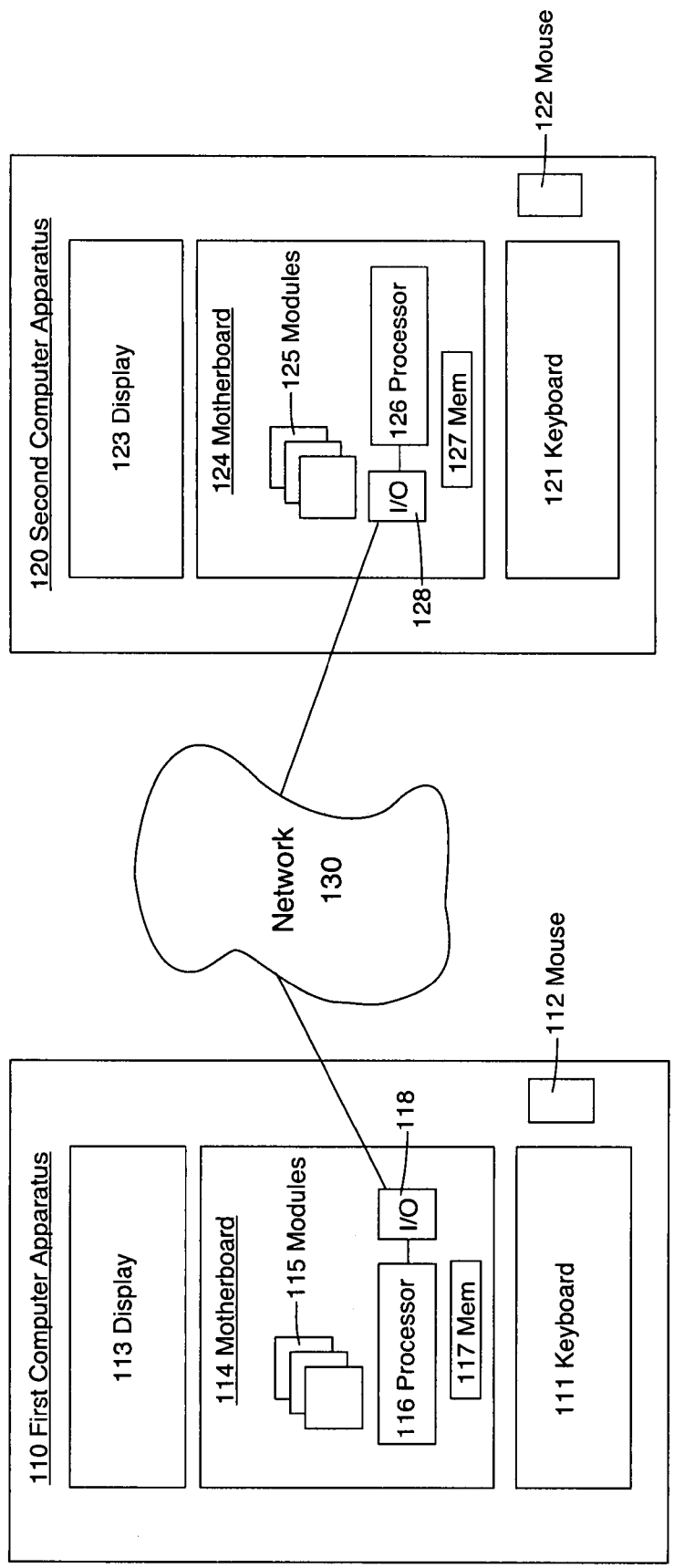
FIG. 1 illustrates a computer system according to an embodiment of the present invention.

FIG. 1 shows a computer system 150 having a first computer apparatus 110 and a second computer apparatus 120 connected via a network 130, for example the Internet, where the first computer apparatus 110 represents a first organisation and the second computer apparatus 120 represents a second organisation.

To allow a user to interact with the first computer apparatus 110 and second computer apparatus 120 respectively the first computer apparatus 110 and second computer apparatus 120 typically include the features of a keyboard 111, 121, mouse 112, 122 and visual display unit 113, 123, which provide the physical 'user interface' of the computer apparatuses 110, 120. Additionally, the first computer apparatus 110 and second computer apparatus 120 include a motherboard 114, 124 and a plurality of modules 115, 125, where the modules 115, 125 are other functional elements of the computer apparatuses 110, 120 of essentially any kind appropriate to the relevant computer apparatus (the functional significance of such elements is not relevant to the present invention and will not be discussed further herein).

The motherboards 114, 124 of the first computer apparatus 110 and second computer apparatus 120 includes (among other standard components) a main processor 116, 126, main memory 117, 127, and an Input/Output (IO) device 118, 128 that is used to couple the first computer apparatus 110 and second computer apparatus 120 to the network 130.

Figure 2A:
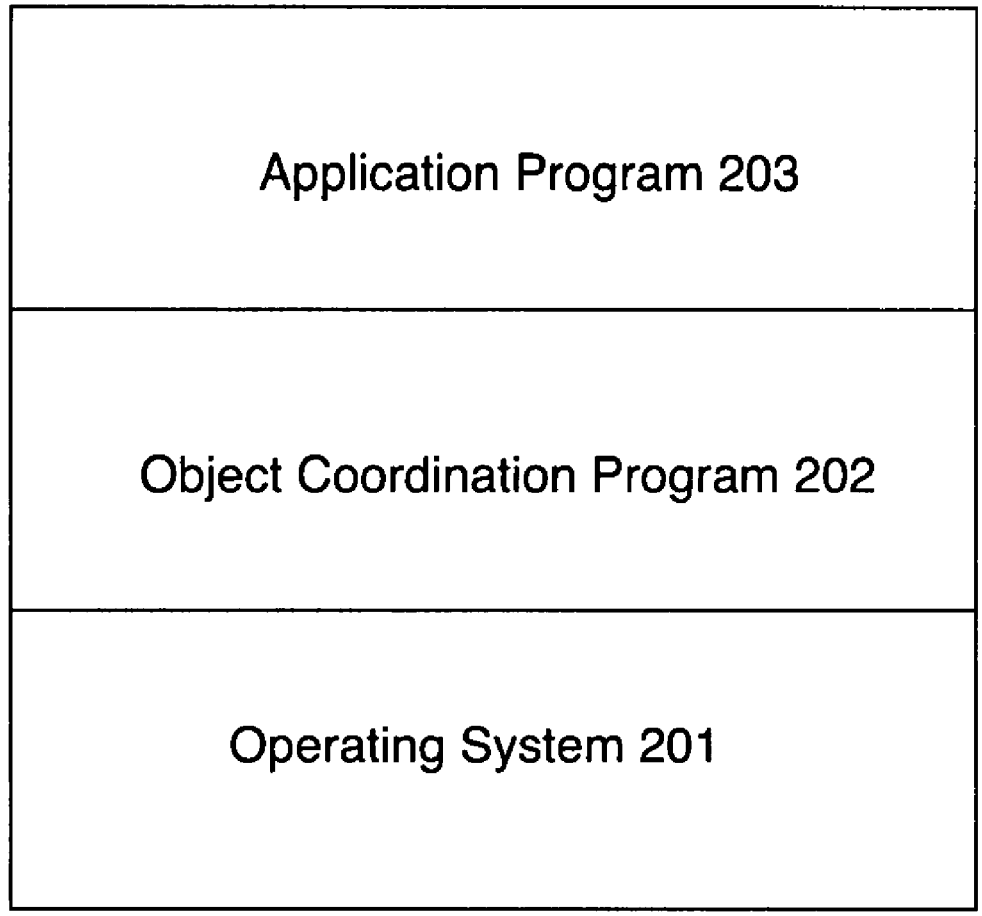
FIG. 2a illustrates a software protocol stack according to an embodiment of the present invention.

As shown in FIG. 2a, the processors 116, 126 are arranged to execute an operating system 201, object coordination program 202 and an application program 203. The application program 203 is arranged to run on top of the object coordination program 202, with the object coordination program 202 arranged to run on top of the operating system 201, in practice there will typically be a plurality of application programs loaded on top of the object coordination program 202. The operating system 201, object coordination program 202 and application program software 203 are typically stored in memory 117, 127 for access by the processor 116, 126 on execution.

Figure 2B:
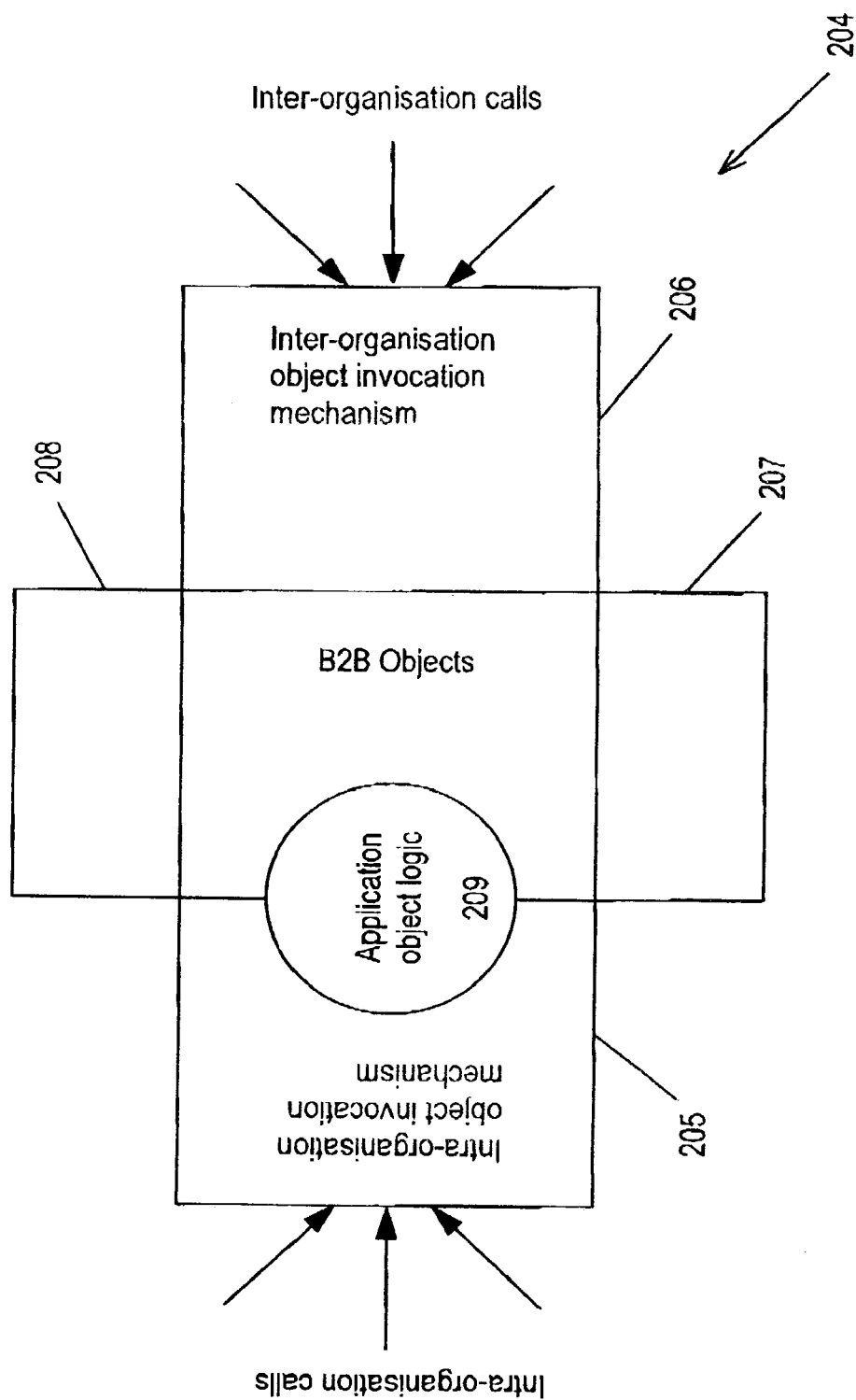
FIG. 2b illustrates components of an object coordination program according to an embodiment of the present invention.

Each respective application program 203 is arranged to control the execution of a transaction between the first computer apparatus 110 and second computer apparatus 120, as described below. The object coordination program 202 includes an augmented object application 204, as shown in FIG. 2b. Each augmented object application 204 maintains a copy of transaction information (i.e. object state) accessible by the application program, through an application program interface API as described below, where the object state represents the status of a transaction between the first computer apparatus 110 and second computer apparatus 120.

Each augmented object application 204 includes an intra-enterprise object invocation mechanism 205, an inter-enterprise object invocation mechanism 206, a certificate store 207, a non-repudiation log 208 and application object logic 209.

The intra-enterprise object invocation mechanism 205 provides the respective organisations with an internal interface to their respective object state that guarantees that state changes (i.e. changes to the program accessible information) are coordinated with partner organisations (i.e. companies that form part of the same organisation, that may, for example, be connected by an intranet (not shown)).

The inter-enterprise object invocation mechanism 206 provides the external computer apparatus with an interface to the internal object state that guarantees that any state changes are coordinated with the external computer apparatus.

An interface to a certificate store 207 is provided to authenticate organisational access and to verify signatures on the actions of the organisations involved in a transaction where the certificate store 207 maintains copies of certificates associated with external organisations.

The non-repudiation log 208 stores evidence of actions on the relevant object state, as described below.

The application object logic 209 defines the rules/criteria for allowing a change to an object state.

As stated above, to allow the object coordination program 202 to interface with the application program 203 running on top of the object coordination program 202 the object coordination program 202 is arranged to include an API that facilitates easy incorporation of calls required to perform object state coordination.

Examples of possible operations provided by the API include:

Connection management: Operations 'connect' and 'disconnect' allow an object state to be added to and removed from the set of object states that are coordinated by the object coordination program 202. Operations 'validateConnect' and 'validateDisconnect' are used to veto the connection to and disconnection of object states.

Groups of changes: Operations 'enter' and 'leave' are used to demarcate the scope of accesses that need to be coordinated. Not all the intermediate accesses between calling 'enter' then 'leave' require coordination; only the state when 'leave' is called need be coordinated. It is not necessary to call 'enter' and 'leave' from the same method call on the object states. This allows the application program 203 to make a series of method invocations on the object state and only after the last of these invocations will coordination be performed.

Access type indication: Operations 'examine', 'update' and 'overwrite' are used to indicate what form of object state coordination is required by the application program 203. The 'examine' operation is used to indicate that, within a particular scope, the object state will not be modified only examined. This means that the object's state will be up-to-date immediately after 'examine' is called but will not require coordination when 'leave' is called. The 'update' operation is used to indicate that, within a particular scope, the object state will be examined and modified. This means that the object's state will require being up-to-date immediately after 'update' is called and will require coordination when 'leave' is called. The 'overwrite' operation is used to indicate that, within a particular scope, the object state will be modified but not examined. This means that the object's state is not required to be up-to-date immediately after 'overwrite' is called but will require coordination when 'leave' is called.

State change validation and update: Two call-back operations, 'validState' and 'validUpdate' can be used to determine if proposed object state changes are acceptable to the application objects, where the relevant application program determines if the object state is valid, with the object coordination program determining if the request is valid (e.g. the object coordination program checks whether a signature is valid). For example: an object state corresponding to an order between a customer and supplier could have an associated rule that only customers can add and remove items, and set item quantity, and that only the supplier can set the prices of items. If the object state changes are acceptable then the operations 'setState' or 'applyUpdate' are used to replace the complete state of the object or to apply an update to the state, respectively.

To ensure that changes to an object state are coordinated and validated between the first computer apparatus 110 and second computer apparatus 120 a validation protocol is implemented, where for the purposes of this embodiment the following notation is used.

$S_i$ is the state of organisations i's copy of an object;
$PS_1$ is new object state proposed by organisation i;
$h(x)$ is a one-way, collision-resistant hash of x;
$sig_i(x)$ is organisations i's signature of x.

A process for performing a change to an object state distributed between two organisations (e.g. the first computer apparatus and the second computer apparatus) will now be described.

For the purposes of this embodiment organisation A, associated with the first computer apparatus 110, makes a changes to their local copy of an object state maintained in their augmented object application 204 where this change needs to be coordinated and validated with organisation B, associated with the second computer apparatus 120. That is to say organisation A has created $PS_A$ for an object and wishes to update organisation B's copy of the corresponding object with this proposed new state. To allow this object state change to be validated and incorporated in organisation B's version of the object state the validation process proceeds as follows:

Organisation A generates $sig_A(h(PS_A))$;
Organisation A sends to organisation B, over the network 130: $\{sig_A(h(PS_A)), PS_A\}$;
Organisation B verifies the signature on $sig_A(h(PS_A))$, using organisation A's certificate that is stored in organisation B's certificate store, and that $h(PS_A)$ agrees with the signed hash value provided by organisation A;
Organisation B attempts to validate $PS_A$ via an application program upcall.

If the proposed change $PS_A$ complies with the appropriate rules associated with the transaction between organisation A and organisation B, organisation B validates the change:
Organisation B updates his local object state: $S_B=PS_A$;
Organisation B generates $sig_B(sig_A(h(PS_A)))$;
Organisation B sends to organisation A: $sig_B(sig_A(h(PS_A)))$ as confirmation of validation and state update, where organisation A uses a copy of organisation B's certificate stored in organisation A's certificate store 207 to decrypt the data;
Organisation B stores evidence relating to the object state update (e.g. $sig_A(h(PS_A))$) in non-repudiation log 208, thereby allowing organisation B to provide irrefutable evidence that organisation A had proposed the change.

If the proposed change $PS_A$ does not comply with the appropriate rules associated with the transaction between organisation A and organisation B, organisation B is unable to validate the change:
Organisation B rejects $PS_A$ and an exception is raised.

The result of this process is that either organisation A and organisation B have countersigned evidence of a new agreed object state and have installed this new object state; or the proposed new state is known to have been rejected by organisation B.

A process for performing a change to an object state distributed between more than two organisations will now be described.

For the purposes of this embodiment organisation 0 makes a changes to their local copy of an object state maintained in their augmented object application 204 where this change, to be valid, needs to be coordinated with the other n−1 organisations. That is to say organisation 0 has created $PS_0$ for an object state and wishes to update the other n−1 organisation's copies of the corresponding object with this proposed new state. To allow this object state change to be validated and incorporated in the n−1 organisation's versions of the object state the validation process proceeds as follows:

For organisations i=1 . . . n−1:

Organisation 0 sends organisations i: $\{sig_0(h(PS_0)), PS_0\}$;

For organisations i=1 . . . n−1 organisations i verify the signature on $sig_0(h(PS_0))$, using organisation 0's certificate that is stored in organisation i's certificate store 207, and that $h(PS_0)$ agrees with the signed hash value provided by organisation 0;

Organisation 0 attempts to validate $PS_0$ via an application program upcall If the proposed change $PS_0$ complies with the appropriate rules associated with the transaction between the n organisations, organisation i=1 . . . n−1 are able to validate the change:

For organisations i=1 . . . n−1:

Organisation i generates $sig_1(sig_0(h(PS_0)))$;

For organisations i=1 . . . n−1;

Organisations i sends organisation 0: $sig_1(sig_0(h(PS_0)))$ as confirmation of validation and state update;

For organisations i=1 . . . n−1:

For organisations j=1 . . . n−1:

if (j !=i) organisation 0 sends organisation j: $sig_i(sig_0(h(PS_0)))$.

For organisations i=1 . . . n−1 organisation i stores evidence relating to the object state update (e.g. $sig_0(h(PS_0))$) in non-repudiation log 208, thereby allowing the organisations to provide irrefutable evidence that organisation 0 had proposed the change and that all other organisations find this change acceptable.

Organisation i updates their local object state: $S_i = PS_0$;

If the proposed change $PS_0$ does not comply with the appropriate rules associated with the transaction between the organisation i=1 . . . n−1, organisation i is unable to validate the change:

Organisation i rejects $PS_0$ and an exception is raised.

If any organisation's validation of proposed state $PS_0$ fails then any organisations that have installed a now invalidated state may recover to a previously valid state.

The result of this process is that either the i=1 . . . n−1 organisations have countersigned evidence of a new agreed object state and have installed this new object state; or the proposed new state is known to have been rejected by one or more of the i=1 . . . n−1 organisations.

Described below are two illustrative examples of transactions between organisations in which coordinated distributed object states, as described above, are utilised. The first example, Tic-Tac-Toe, is a two-party game in which the players take turns to modify the shared state of the game according to well defined symmetrically applied rules. Turn-taking access to shared state is characteristic of other applications such as shared white boards. The second, an order-processing example, demonstrates sharing between two parties, the customer and supplier, according to asymmetric rules. However, the order-processing example could be extended to involve more than two parties based upon, for example, the above multi-party protocol.

The aim of a game of Tic-Tac-Toe is to claim a horizontal, vertical or diagonal line of squares before your opponent where players take turns to play. The rules of the game are symmetric. For a player using Nought, a vacant square is claimed by marking it with a zero with the rules that Nought cannot mark any square with a cross and Nought cannot overwrite an already claimed square.

Figure 3:
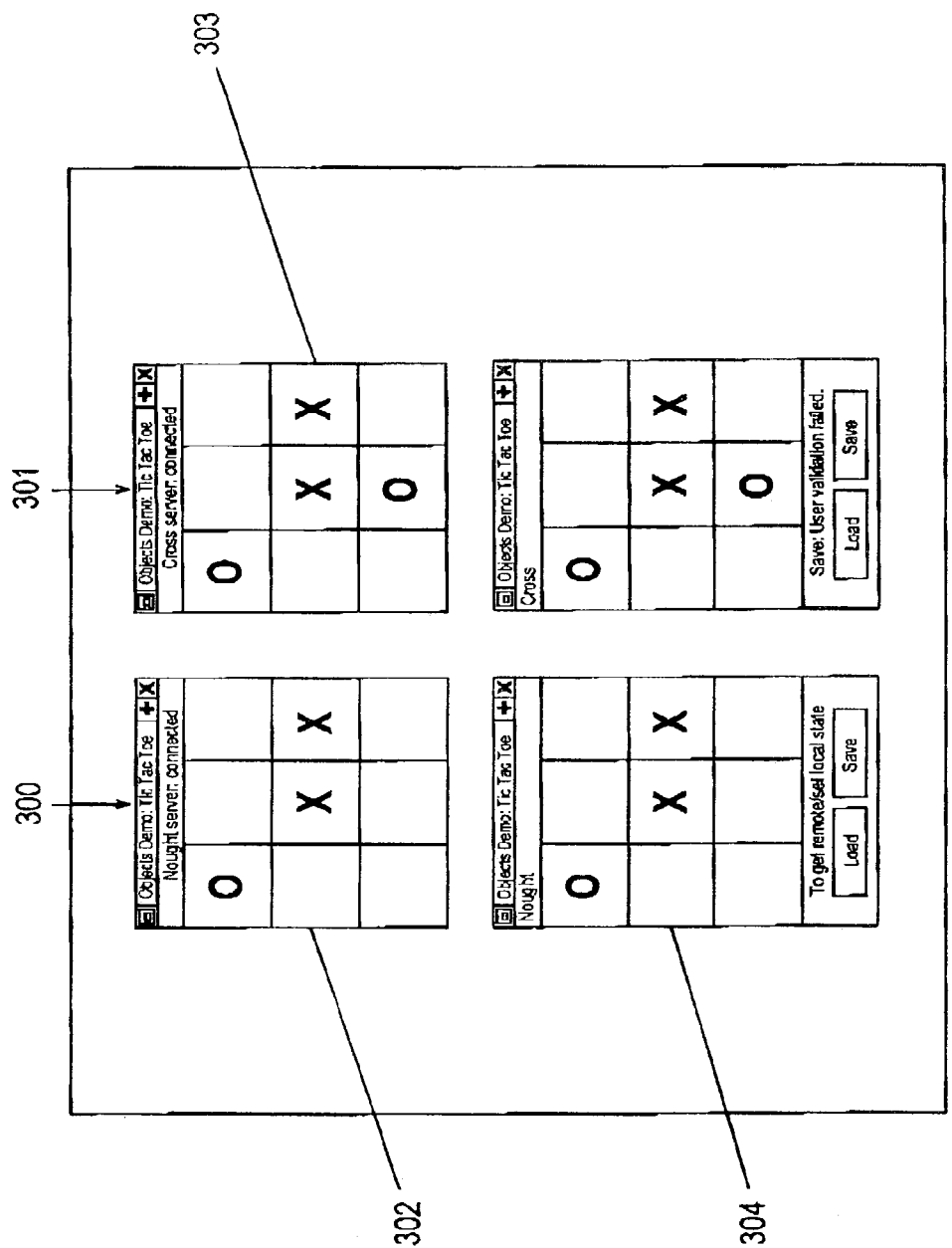
FIG. 3 illustrates an example of a transaction according to an embodiment of the present invention.

Computer apparatuses (not shown) representing each player share an object state that represents the state of the game, as shown in FIG. 3, and coordinates the object state, where the rules of the game are encapsulated in the application object logic.

A player communicates a move to their coordination object program loaded on their computer apparatus using their local Tic-Tac-Toe application program (not shown) via an API call. At each proposed move (i.e. change in object state) the coordination object program execute the logic via the 'validstate' upcall. The coordination object program validates each proposed move (i.e. object state change) via the upcall, as described above. A validated move is retrieved by the appropriate Tic-Tac-Toe application program using an API call.

FIG. 3 shows an example of the Tic-Tac-Toe game in progress after the following sequence of moves: Cross 301 claims middle row, centre square; Nought 300 claims top row, left square; Cross 301 claims middle row, right square, which is reflected in Nought's 300 object state 302. If Cross 301 attempts to mark bottom row, centre square with a zero, which is reflected in Cross's object state 303, in an attempt by Cross 301 to gain advantage by preempting Nought's 300 next move, Nought 300 will identify that this change is invalid and will not update Nought's 300 object state 304. As such, the agreed state of the game will not been updated and Nought 300 will have evidence of the attempt by Cross 301 to cheat.

In the second example, a customer 400 and supplier 401 share an object state corresponding to an order where asymmetric validation rules apply to object state changes.

The rules, as defined in the application object logic, stipulate that the customer 400 is allowed to add items and the quantity required to an order but is not allowed to price the items. The supplier 401 can price items but cannot amend the order in any other way.

Figure 4:
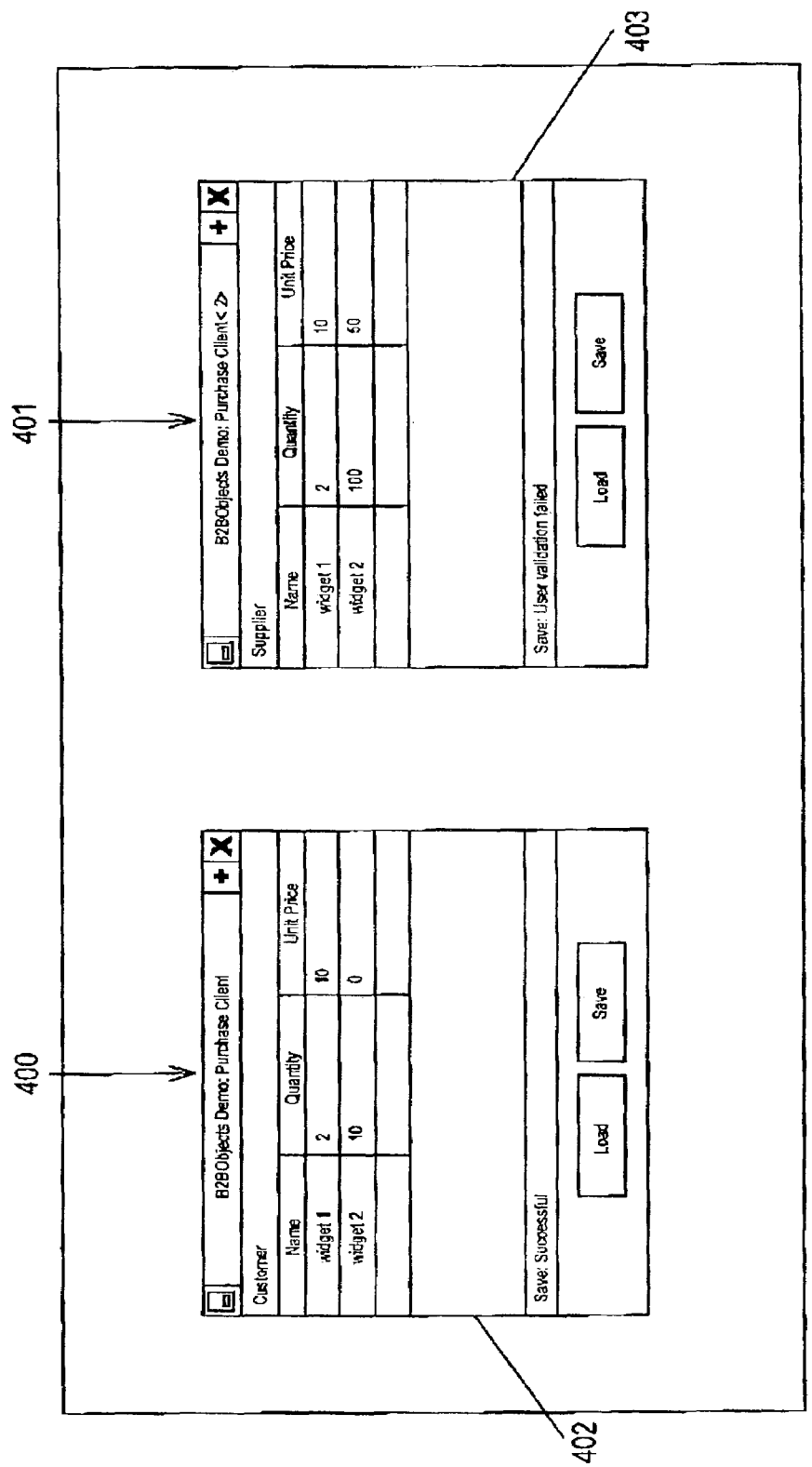
FIG. 4 illustrates an example of a transaction according to an embodiment of the present invention.

The customer 400 and supplier 401 each has a replica of an object state 402, 403 that corresponds to the order, which in the example shown in FIG. 4 show that the customer 400 orders two widget1's. This is a valid entry and, so, the supplier 401 prices widget1 at 10 per unit. Utilising the above described protocol the supplier's 401 action is validated and reflected in the customer's 400 copy of the order (i.e. object state). The customer 400 then amends the order for the supply of ten widget2's. This entry is validated and reflected in the supplier's 401 copy of the order. The supplier 401 then attempts to price widget2, a valid action, and change the quantity required to one hundred, an invalid action. As this action is invalid the order is rejected and is not reflected in the customer's 400 copy of the object state 402, thereby allowing the customer 400 to refute the order, using, if necessary, the supplier's 401 irrefutable evidence that the supplier 401 invalidly changed the order.

The invention claimed is:

1. A computer system comprising:
   a first computer entity and a second computer entity each having program-accessible information and each having access to a set of rules for modifying the program-accessible information;
   wherein the second computer entity is arranged to modify the second computer entity's program-accessible information in accordance with a received change to the first computer entity's program-accessible information if the second computer entity determines that the received change to the first computer entity's program-accessible information complies with said set of rules and irrefutably establishes that the received change is associated with the first computer entity; and wherein the first computer entity is arranged to modify the first computer entity's program-accessible information in accordance with a received chance to the second computer entity's program-accessible information if the first computer entity determines that the received change to the second computer entity's program-accessible information complies with said set of rules and irrefutably establishes that the received change is associated with the second computer entity.

2. A computer system according to claim 1, wherein irrefutability is determined based upon a predetermined criterion.

3. A computer system according to claim 2, wherein the predetermined criteria is the electronic signing of the received change or representation of the change with a private key of the first computer entity.

4. A computer system according to claim 3, wherein the second computer entity further comprises a memory for storing a copy of a certificate associated with the first computer entity to allow the second computer entity to authenticate the first computer entity's electronic signature.

5. A computer system according to claim 1, wherein the second computer entity is arranged to provide a confirmation of acceptance of change to the second computer entity's program-accessible information to the first computer entities.

6. A computer system according to claim 1, wherein the program-accessible information is an object state.

7. A computer system comprising a first and second computer entity having program-accessible information; wherein the second computer entity is arranged to modify the second computer entity's program-accessible information in accordance with a received change to the first computer entity's program-accessible information if the second computer entity determines that the received change to the first computer entity's program-accessible information complies with a first predetermined criteria and establishes that the received change is associated with the first computer entity based upon trusted third party data associated with the first computer entity; and wherein the first computer entity is arranged to modify the first computer entity's program-accessible information in accordance with a received change to the second computer entity's program-accessible information if the first computer entity determines that the received change to the second computer entity's program-accessible information complies with said first predetermined criteria and establishes that the received change is associated with the second computer entity based upon trusted third party data associated with the second computer entity.

8. A computer system according to claim 7, wherein the received change or representation of the change is signed with the trusted third party data.

9. A computer system according to claim 8, wherein the second computer entity further comprises a memory for storing a copy of a certificate associated with the trusted third party to allow the second computer entity to authenticate the signed change or representation of the change signed with the trusted third party data.

10. A computer system comprising a plurality of computer entities, wherein each computer entity includes program-accessible information; and wherein each computer entity is arranged to accept a change to its respective program-accessible information in accordance with a received change to another computer entity's program-accessible information if the computer entity determines that the change to the another computer entity's program-accessible information complies with first predetermined criteria of the respective computer entities and irrefutably establishes that the received change is associated with the another computer entity.

11. A computer system according to claim 10, wherein irrefutability is determined based upon a second predetermined criterion.

12. A computer system according to claim 11, wherein the second predetermined criteria is the electronic signing of the received change or representation of the change with a private key of the another computer entity.

13. A computer system according to claim 10, wherein the first predetermined criteria determines the rules for allowing the respective computer entities to implement a change to the respective computer entities' program-accessible information.

14. A computer system according to claim 13, wherein a rule for allowing the respective computer entities to implement a change to the respective computer entities' program-accessible information is that all other computer entities of the computer system irrefutably validate the change.

15. A computer system comprising a first and second computer entity that each have access to respective program-accessible information corresponding to a shared transaction state of an application program running on each of said first and second computer entities; wherein at least the second computer entity comprises middleware arranged to modify the second computer entity's program-accessible information in accordance with a received change to the first computer entity's program-accessible information if the second computer entity determines that the received change to the first computer entity's program-accessible information complies with at least a first predetermined criteria and irrefutably establishes that the received change is associated with the first computer entity, the middleware being arranged to signal to the first computer entity such modification using irrefutable evidence, wherein the first predetermined criteria is applied by an application program that interacts with the middleware.

16. A computer system according to claim 15, wherein irrefutability is determined based upon a second predetermined criterion.

17. A computer system according to claim 16, wherein the second predetermined criteria is the electronic signing of the received change or representation of the change with a private key of the first computer entity.

18. A computer system according to claim 17, wherein the second computer entity further comprises a memory for storing a copy of a certificate associated with the first computer entity to allow the second computer entity to authenticate the first computer entity's electronic signature.

19. A computer system according to claim 16, wherein the first predetermined criteria determine the rules for allowing the first computer entity to implement a change to the first computer entity's program-accessible information.

20. A computer system according to claim 16, wherein the program-accessible information is an object state.

21. A method for operating an object coordination program in a computer entity that has access to an object state corresponding to a transaction involving another computer entity, comprising: receiving a change to the transaction state from the other computer entity irrefutably establishing that the received change is associated with the other computer entity; determining that the received change complies with at least a first predetermined criteria; modifying the object state in accordance with the received change signalling to the other computer entity such modification using irrefutable evidence, wherein the first predetermined criteria is applied by an call to application program that interacts with the object coordination program.

22. A method according to claim 21, wherein the first predetermined criteria determine the rules for allowing the other computer entity to implement a change to the object state.

23. A method for updating memory objects stored by at least two computers wherein each of said at least two computers stores a copy of the memory objects, the method comprising:

permitting either of the at least two computers to propose a change to one or more of said memory objects according to a set of rules shared by said at least two computers, said change being proposed by sending a copy of the proposed change from a sending one of said at least two computers to a receiving one of said at least two computers; and the receiving one of said at least two computers validating the proposed change received from the sending one of said at least two computers against the set of rules shared by said at least two computers before updating the copy of the memory objects stored at the receiving one of said at least two computers.

24. The method of claim 23 wherein the receiving one of said at least two computers irrefutably validates an identity of the sending one of said at least two computers before attempting to validate the proposed change received from the sending one of said at least two computers.

25. The method of claim 23 wherein the sending one of said at least two computers signs the proposed change with a secure electronic signature which irrefutably associates the proposed change either with the sending computer or a person or organization associated with the sending computer.

* * * * *